US012798334B2

(12) United States Patent
Hamada et al.

(10) Patent No.: US 12,798,334 B2
(45) Date of Patent: Nov. 17, 2026

(54) HEATER ELEMENT AND VEHICLE INTERIOR PURIFICATION SYSTEM

(71) Applicant: NGK INSULATORS, LTD., Nagoya-City (JP)

(72) Inventors: Takafumi Hamada, Nagoya (JP); Hirotaka Saito, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 509 days.

(21) Appl. No.: 18/533,326

(22) Filed: Dec. 8, 2023

(65) Prior Publication Data

US 2024/0239153 A1 Jul. 18, 2024

(30) Foreign Application Priority Data

Jan. 17, 2023 (JP) ................................ 2023-005440

(51) Int. Cl.
*B60H 1/22* (2006.01)
*B60H 1/00* (2006.01)
(Continued)

(52) U.S. Cl.
CPC ....... *B60H 1/2225* (2013.01); *B60H 1/00835* (2013.01); *B60H 3/0658* (2013.01);
(Continued)

(58) Field of Classification Search
CPC .............. B60H 1/00835; B60H 1/2225; B60H 2001/2271; B60H 3/0658; F24H 2250/04;
(Continued)

(56) References Cited

U.S. PATENT DOCUMENTS

2020/0223293 A1 7/2020 Matsumoto et al.
2021/0041141 A1 2/2021 Miyairi et al.
(Continued)

FOREIGN PATENT DOCUMENTS

JP S51-027460 U 2/1976
JP H08-052318 A 2/1996
(Continued)

OTHER PUBLICATIONS

Japanese Office Action for Japanese Application No. 2023-005440 dated Jul. 21, 2026.

*Primary Examiner* — Quang T Van
(74) *Attorney, Agent, or Firm* — Muncy, Geissler, Olds & Lowe, P.C.

(57) ABSTRACT

A heater element includes: a honeycomb structure having an outer peripheral wall and partition walls disposed on an inner side of the outer peripheral wall, the partition walls defining a plurality of cells, each of the cells extending from a first end face to a second end face to form a flow path; a first electrode including an electrode portion A1 provided on the first end face, and an electrode portion B1 connected to the electrode portion A1 and provided on surfaces of the partition walls in an extending direction of the flow path from the first end face; and a second electrode including an electrode portion A2 provided on the second end face, and an electrode portion B2 connected to the electrode portion A2 and provided on surfaces of the partition walls in the extending direction of the flow path from the second end face.

14 Claims, 10 Drawing Sheets

(51) Int. Cl.
*B60H 3/06* (2006.01)
*F24H 3/04* (2022.01)
*H05B 3/03* (2006.01)
*H05B 3/14* (2006.01)

(52) U.S. Cl.
CPC ........... *F24H 3/0429* (2013.01); *H05B 3/141* (2013.01); *F24H 2250/04* (2013.01); *H05B 2203/02* (2013.01); *H05B 2203/024* (2013.01)

(58) Field of Classification Search
CPC .............. F24H 3/0429; H05B 2203/02; H05B 2203/024; H05B 3/141
USPC .................................. 219/202, 505; 392/360
See application file for complete search history.

(56) References Cited

U.S. PATENT DOCUMENTS

| | | | | |
|---|---|---|---|---|
| 2022/0227672 | A1 | 7/2022 | Hayase et al. | |
| 2023/0382188 | A1* | 11/2023 | Miyairi ................ | B60H 1/2215 |
| 2024/0270055 | A1* | 8/2024 | Miyairi ................ | B60H 1/2225 |

FOREIGN PATENT DOCUMENTS

| | | | |
|---|---|---|---|
| JP | 2020-104774 | A | 7/2020 |
| JP | 2020-111282 | A | 7/2020 |
| JP | 2022-109861 | A | 7/2022 |
| JP | 7754938 | B2 | 10/2025 |
| WO | 2020/036067 | A1 | 2/2020 |

* cited by examiner

HEATER ELEMENT AND VEHICLE INTERIOR PURIFICATION SYSTEM

FIELD OF THE INVENTION

The present invention relates to a heater element and a vehicle interior purification system.

CROSS REFERENCE TO RELATED APPLICATIONS

The present invention claims the benefit of priority to Japanese Patent Application No 2023-005440 filed on Jan. 17, 2023 with the Japanese Patent Office, the entire contents of which are incorporated herein by reference in its entirety.

BACKGROUND OF THE INVENTION

In various types of vehicles such as automobiles, there are increasing requirements for improvement of vehicle interior environment. Specific requirements include reduction of an amount of $CO_2$ in the vehicle interior to suppress driver's drowsiness, control of humidity in the vehicle interior, and removal of harmful volatile components such as odor components and allergy-causing components in the vehicle interior. The effective measure for such requirements includes ventilation, but the ventilation causes a large loss of heater energy in winter, leading to a decreased energy efficiency in winter. In particular, a battery electric vehicle (BEV) has a problem that its cruising range is significantly reduced due to its energy loss.

As a method for solving the above problem, Patent Literatures 1 and 2 disclose a vehicle interior purification system in which components to be removed such as $CO_2$ and water vapor in the air in the vehicle interior are trapped by a functional material such as an adsorbent, and the components to be removed are then allowed to react or desorbed by heating to discharge them to the outside of the vehicle and regenerate the functional material. Such a vehicle interior purification system requires more contact between the air and the functional material in order to ensure the performance of trapping the components to be removed, and the ability of the functional material to be heated to a predetermined temperature in order to facilitate the regeneration of the functional material. The regeneration can be carried out, for example, by removing substances adsorbed on the functional material through an oxidation reaction, and by desorbing and releasing the substances adsorbed on the functional material, but both cases require the heating of the functional material at an appropriate temperature depending on the adsorbed substances.

On the other hand, Patent Literature 3 discloses a heater element, including: a pillar shaped honeycomb structure having an outer peripheral wall and partition walls disposed on an inner side of the outer peripheral wall and defining a plurality of cells forming flow paths from a first end face to a second end face, wherein the partition walls have a PTC property, the partition walls have an average thickness of 0.13 mm or less, and the first end face and the second end face have an opening ratio of 0.81 or more. This heater element is used for heating a vehicle interior, and is an efficient heating means because the honeycomb structure allows the heating area to be increased. Therefore, the use of such a heater element as a support for the functional material can contribute to the shortening of the regeneration time of the functional material. In particular, it is believed that since this heater element can be heated by electric conduction and has a PTC property, it can easily heat the functional material, while suppressing excessive heat generation and thermal deterioration of the functional material. Further, since the risk of excessive temperature is avoided, safety can be ensured even if small initial resistance is set to increase a heating rate, and the temperature can be increased in a short period of time.

However, when a functional material-containing layer is provided on the surface of the partition walls that define the cells of the heater element as described in Patent Literature 3, the temperature near the inlet side of the heater element is difficult to be increased, and the region in the extending direction of the flow path where the functional material can effectively be heated in the cells becomes narrower. In other words, a part of the functional material supported on the heater element has a low regeneration efficiency and cannot be effectively utilized. Further, when the functional material is a catalyst, heating may be required for activation of the catalyst, but if the temperature of the supported catalyst is insufficient, the catalyst cannot be effectively used. The provision of the functional material-containing layer that cannot be effectively utilized will be a factor which will lower the cost performance of the heater element.

Since electrodes for heating the heater element are provided on the first end face and the second end face of the honeycomb structure, it is believed that the region in the extending direction of the flow path where the functional material can be efficiently heated can be widened by providing a pair of electrodes on the first end face and the second end face of the honeycomb structure as well as to extend to a part of the partition walls in the extending direction of the flow path from the first end face and the second end face.

On the other hand, in the vehicle interior purification system, there is a risk that moisture such as rainwater may flow into a region where the heater element supporting the functional material is disposed. Therefore, it is required that the heating performance of the heater element be sufficiently exerted even in such an environment where moisture is present.

However, if a pair of electrodes is provided so as to extend from the first end face and the second end face to a part of the surfaces of the partition walls in the extending direction of the flow path, the presence of moisture during electric conduction leads to electrical connection between the pair of electrodes due to the moisture, causing a short circuit. As a result, the heater element generates excessive heat and may ignites in some cases.

Further, the presence of moisture causes corrosion of the electrodes, which will ultimately lead to poor electrical conduction and reduced heating performance. Since the corrosion rate of the electrode is accelerated in proportion to the current density, the corrosion of the electrodes can be suppressed by increasing the areas of the electrodes to lower the current density. However, as described above, if the areas of the electrodes are excessively increased, the short circuit may occur. Furthermore, if the current density is lowered by reducing the current, the heater element cannot be heated to a predetermined temperature.

The present invention has been made to solve the problems as described above. An object of the present invention is to provide a heater element which is resistant to corrosion of electrodes even in an environment where moisture is present while widening a region in an extending direction of a flow path where a functional material can effectively be heated, and which can suppress the occurrence of short circuit.

Also, another object of the present invention is to provide a vehicle interior purification system including such a heater element.

PRIOR ART

Patent Literatures

[Patent Literature 1] Japanese Patent Application Publication No. 2020-104774 A
[Patent Literature 2] Japanese Patent Application Publication No. 2020-111282 A
[Patent Literature 3] WO 2020/036067 A1

SUMMARY OF THE INVENTION

As a result of intensive studies for the structure of the heater element, the present inventors have found that, based on the finding that a distance between a pair of electrode portions provided so as to extend from the first end face and the second end face to a part of the surfaces of the partition walls in the extending direction of the flow path is closely related to the above problems, the distance can be controlled to a specific range to solve the above problems, and they have completed the present invention. That is, the present invention is illustrated as follows:

(1)

A heater element, comprising:

a honeycomb structure comprising an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property;

a first electrode comprising an electrode portion A1 provided on the first end face, and an electrode portion B1 connected to the electrode portion A1 and provided on surfaces of the partition walls in an extending direction of the flow path from the first end face; and a second electrode comprising an electrode portion A2 provided on the second end face, and an electrode portion B2 connected to the electrode portion A2 and provided on surfaces of the partition walls in the extending direction of the flow path from the second end face, wherein a distance L1 between the electrode portion B1 and the electrode portion B2 is 30 to 97% of a length L3 of the honeycomb structure in the extending direction of the flow path.

(2)

The heater element according to (1), wherein the distance L1 is 50 to 95% of the length L3 of the honeycomb structure in the extending direction of the flow path.

(3)

The heater element according to (1) or (2), wherein a distance L2 between the electrode portions B1 and between the electrode portions B2 facing each other across the cell is 30 to 97% of a hydraulic diameter of the cell.

(4)

The heater element according to (3), wherein the distance L2 is 50 to 95% of the hydraulic diameter of the cell.

(5)

The heater element according to any one of (1) to (4), wherein the material having the PTC property is made of a material comprising barium titanate as a main component, the material being substantially free of lead.

(6)

The heater element according to any one of (1) to (5), wherein the material having the PTC property has a volume resistivity of 0.5 to 30 Ω·cm at 25° C.

(7)

The heater element according to any one of (1) to (6), wherein the honeycomb structure has a thickness of the partition wall of 0.3 mm or less, a cell density of 100 cells/$cm^2$ or less, and a cell pitch of 1.0 mm or more.

(8)

The heater element according to any one of (1) to (6), wherein the honeycomb structure has a thickness of the partition wall of 0.08 to 0.36 mm, a cell density of 2.54 to 140 cells/$cm^2$, and an opening ratio of the cells of 0.70 or more.

(9)

The heater element according to any one of (1) to (8), comprising a functional material-containing layer on surfaces of the partition walls on which the electrode portions B1 and B2 are not provided.

(10)

The heater element according to (9), further comprising the functional material-containing layer on surfaces of the electrode portions B1 and B2.

(11)

The heater element according to (9) or (10), wherein the functional material-containing layer comprises a functional material having a function of adsorbing one or more selected from water vapor, carbon dioxide, and volatile components.

(12)

The heater element according to any one of (9) to (11), wherein the functional material-containing layer comprises a catalyst.

(13)

A vehicle interior purification system, comprising:

at least one heater element according to any one of (1) to (12);

a power supply for applying a voltage to the heater element;

an inflow pipe communicating a vehicle interior with the first end face of the heater element;

an outflow pipe having a first path communicating the second end face of the heater element with the vehicle interior; and a ventilator for causing an air from the vehicle interior to flow into the first end face of the heater element through the inflow pipe.

(14)

The vehicle interior purification system according to (13), wherein the outflow pipe has, in addition to the first path, a second path communicating the second end face of the heater element with the outside of a vehicle, wherein the outflow pipe has a switching valve capable of switching the flow of the air flowing through the outflow pipe between the first path and the second path, and wherein the vehicle interior purification system comprises a control unit capable of executing switching between:

a first mode wherein the voltage applied from the power supply is turned off, the switching valve is switched such that the air flowing through the outflow pipe passes through the first path, and the ventilator is turned on; and a second mode wherein the voltage applied from the power supply is turned on, the switching valve is switched such that the air flowing through the outflow pipe passes through the second path, and the ventilator is turned on.

DETAILED DESCRIPTION OF THE INVENTION

A heater element according to an embodiment of the present invention includes: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; a first electrode including an electrode portion A1 provided on the first end face, and an electrode portion B1 connected to the electrode portion A1 and provided on surfaces of the partition walls in an extending direction of the flow path from the first end face; and a second electrode including an electrode portion A2 provided on the second end face, and an electrode portion B2 connected to the electrode portion A2 and provided on surfaces of the partition walls in the extending direction of the flow path from the second end face. Further, a distance L1 between the electrode portion B1 and the electrode portion B2 is 30 to 97% of a length L3 of the honeycomb structure in the extending direction of the flow path. Such a configuration can widen a region in the extending direction of the flow path where the functional material can be effectively heated. Also, the electrodes are resistant to corrosion even in an environment where moisture such as rainwater is present, and the occurrence of short circuits can be suppressed.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

(1. Heater Element)

The heater element according to an embodiment of the present invention can be suitably utilized as a heater element for use in a vehicle interior purification system for various vehicles such as automobiles. The vehicle includes, but not limited to, automobiles and trains. Non-limiting examples of the automobile include a gasoline vehicle, a diesel vehicle, a gas fuel vehicle using CNG (a compressed natural gas) or LNG (a liquefied natural gas), a fuel cell vehicle, an electric vehicle, and a plug-in hybrid vehicle. The heater element according to the embodiment of the present invention can be particularly suitably used for a vehicle having no internal combustion engine such as electric vehicles and electric railcars.

Figure 1A:
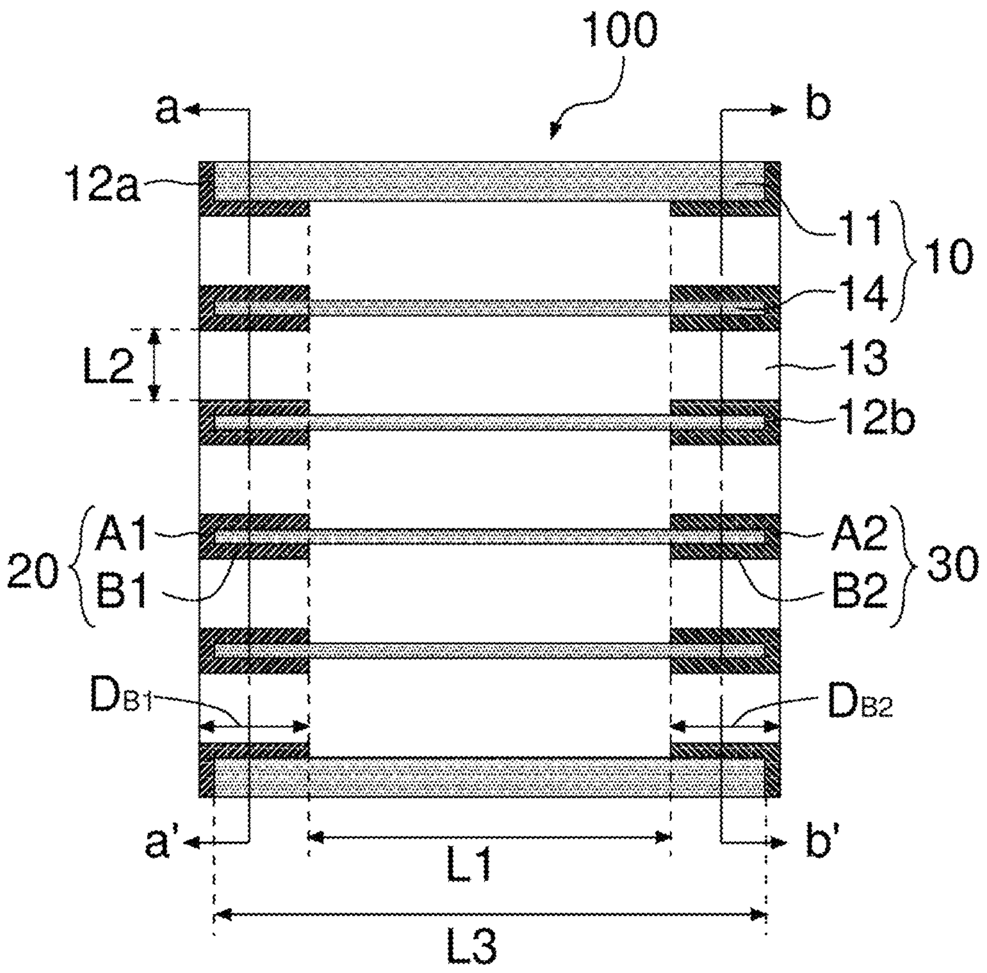
FIG. 1A is a schematic view of a cross section of a heater element according to an embodiment of the invention, which is parallel to an extending direction of cells (flow path)
Figure 1B:
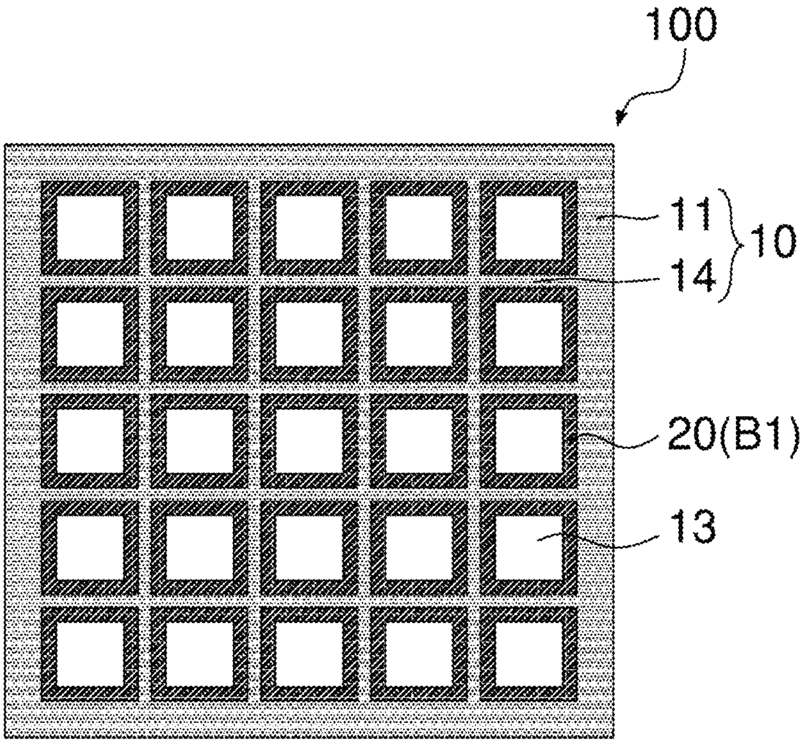
FIG. 1B is a schematic cross-sectional view taken along the line a-a' in FIG. 1A.

FIG. 1A is a schematic view of a cross section of a heater element according to an embodiment of the invention, which is parallel to an extending direction of cells (flow path). Further, FIG. 1B is a schematic cross-sectional view taken along the line a-a' in FIG. 1A. It should be noted that the cross section taken along the line b-b' in FIG. 1A is omitted because the electrode portion B1 of the first electrode 20 in FIG. 1B is simply replaced by the electrode portion B2 of the second electrode 30.

As shown in FIGS. 1A and 1B, a heater element 100 includes: a honeycomb structure 10 having an outer peripheral wall 11 and partition walls 14 disposed on an inner side of the outer peripheral wall 11 and defining a plurality of cells 13 to form flow paths extending from a first end face 12*a* to a second end face 12*b*; a first electrode 20 provided on the first end face 12*a* side and a second electrode 30 provided on the second end face 12*b* side. The first electrode 20 includes an electrode portion A1 provided on the first end face 12*a*, and an electrode portion B1 connected to the electrode portion A1 and provided on surfaces of the partition walls 14 in the extending direction of the flow path from the first end face 12*a*. The second electrode 30 includes an electrode portion A2 provided on the second end face 12*b*, and an electrode portion B2 connected to the electrode portion A2 and provided on the surfaces of the partition walls 14 in the extending direction of the flow path from the second end face 12*b*.

Figure 2A:
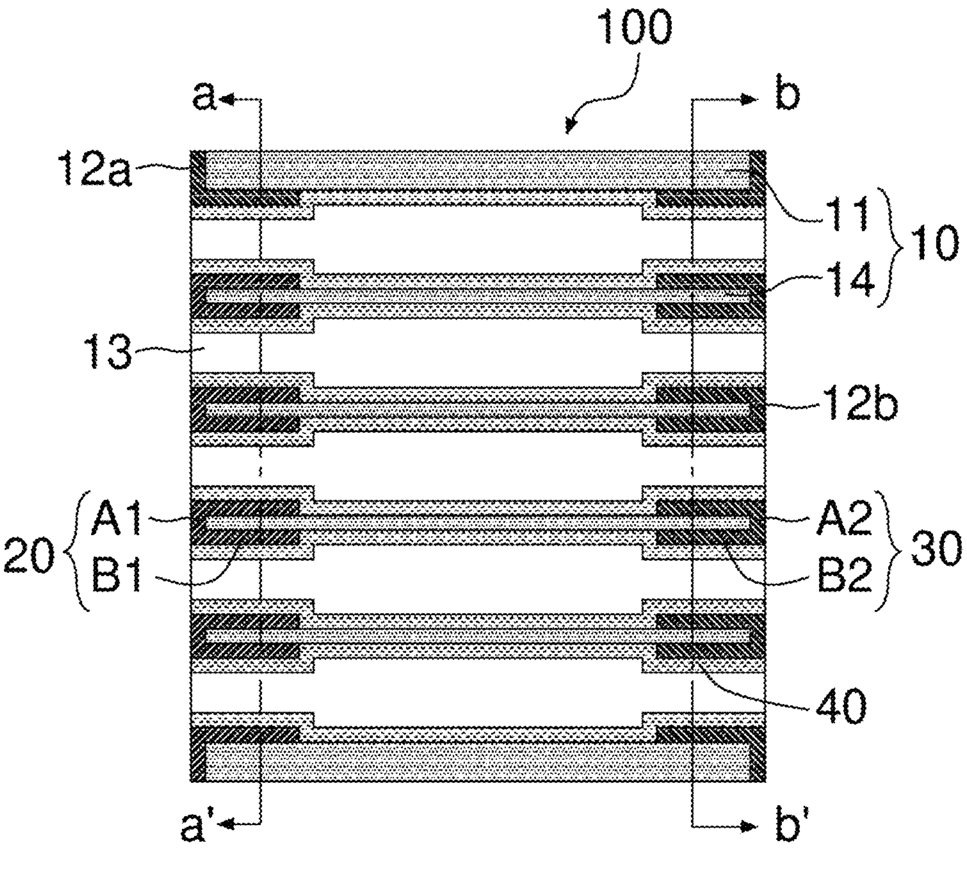
FIG. 2A is a schematic view of a cross section of a heater element according to another embodiment of the present invention, which is parallel to an extending direction of cells (flow path)
Figure 2B:
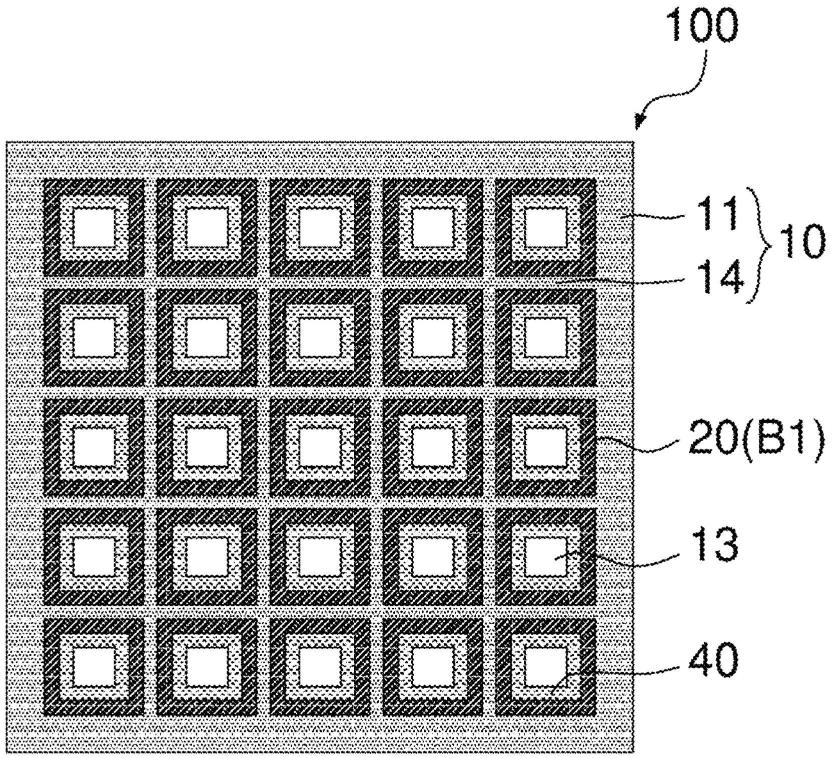
FIG. 2B is a schematic cross-sectional view taken along the line a-a' in FIG. 2A.

The heater element 100 can be used as a support (carrier) for forming a functional material-containing layer. FIG. 2A shows a schematic view of a cross section with the functional material-containing layer formed on the heater element, which is parallel to the extending direction of the cells (flow path), and FIG. 2B shows a schematic view of a cross section taken along the line a-a' in FIG. 2A. It should be noted that the cross section taken along the line b-b' in FIG. 2A is omitted because the electrode portion B1 of the first electrode 20 in FIG. 2B is simply replaced by the electrode portion B2 of the second electrode 30. FIGS. 2A and 2B have the same configurations as those of FIGS. 1A and 1B with the exception that the functional material-containing layer is formed.

As shown in FIGS. 2A and 2B, the heater element 100 includes a functional material-containing layer 40 provided on the surfaces of the partition walls 14 where the electrode portions B1 and B2 are not provided, and on the surfaces of the electrode portions B1 and B2.

Each member forming the heater element 100 will be described below in detail.

(1-1. Honeycomb Structure)

The shape of the honeycomb structure 10 is not particularly limited. For example, an outer shape of a cross section of the honeycomb structure 10 orthogonal to the flow path direction (the extending direction of the cells 13) can be polygonal such as quadrangular (rectangular, square), pentagonal, hexagonal, heptagonal, and octagonal, circular, oval (egg-shaped, elliptical, elliptic, rounded rectangular, etc.), or the like. The end faces (first end face 12*a* and second end face 12*b*) have the same shape as the cross section. Also, when the cross section and the end faces are polygonal, the corners may be chamfered.

The shape of each cell 13 is not particularly limited, but it may be polygonal such as quadrangular, pentagonal, hexagonal, heptagonal, and octagonal, circular, or oval in the cross section of the honeycomb structure 10 orthogonal to the flow path direction. These shapes may be alone or in combination of two or more. Moreover, among these shapes, the quadrangle or the hexagon is preferable. By providing the cells 13 having such a shape, it is possible to reduce the pressure loss when the air flows. FIGS. 1A, 1B, 2A and 2B show, as an example, a honeycomb structure 10 in which the outer shape of the cross section and the shape of each cell 13 are quadrangular in the cross section orthogonal to the flow path direction.

The honeycomb structure 10 may be a honeycomb joined body having a plurality of honeycomb segments and joining layers that join outer peripheral side surfaces of the plurality of honeycomb segments together. The use of the honeycomb joined body can increase the total cross-sectional area of the cells 13, which is important for ensuring the flow rate of air, while suppressing cracking.

It should be noted that the joining layer can be formed by using a joining material. The joining material is not particularly limited, but a ceramic material obtained by adding a solvent such as water to form a paste can be used. The joining material may contain a material having a PTC (Positive Temperature Coefficient) property, or may contain the same material as the outer peripheral wall 11 and the partition walls 14. In addition to the role of joining the honeycomb segments to each other, the joining material can also be used as an outer peripheral coating material after joining the honeycomb segments.

From the viewpoints of ensuring the strength of the honeycomb structure 10, reducing pressure loss when air passes through the cells 13, ensuring the amount of functional material supported, and ensuring the contact area with the air flowing inside the cells 13, it is desirable to suitably combine a thickness of the partition wall 14, a cell density, and a cell pitch (or an opening ratio of the cells 13).

As used herein, the thickness of the partition wall 14 refers to a length of a line segment that is across the partition wall 14 when connecting the centers of gravity of adjacent cells 13 with the line segment in the cross section orthogonal to the flow path direction. The thickness of the partition wall 14 refers to an average thickness of all the partition walls 14.

As used herein, the cell density refers a value obtained by dividing a number of cells by an area of one end face (first end face 12*a* or second end face 12*b*) of the honeycomb structure 10 (the total area of the partition walls 14 and the cells 13 excluding the outer peripheral wall 11).

As used herein, the cell pitch refers to a value obtained by the following calculation. First, the area of one end face (first end face 12*a* or second end face 12*b*) of the honeycomb structure 10 (the total area of the partition walls 14 and the cells 13 excluding the outer peripheral wall 11) is divided by the number of the cells to calculate an area per a cell. A square root of the area per a cell is then calculated, and this is determined to be the cell pitch.

As used herein, the opening ratio of the cells 13 refers a value obtained by dividing the total area of the cells 13 defined by the partition walls 14 by the area of one end face 12*b* (first end face 12*a* or second end face 12*b*) (the total area of the partition walls 14 and the cells 13 excluding the outer peripheral wall 11) in the cross section orthogonal to the flow path direction of the honeycomb structure 10. It should be noted that when calculating the opening ratio of the cells 13, the first electrode 20, the second electrode 30, and the functional material-containing layer 40 are not taken into account.

In an embodiment that is advantageous from the viewpoint of supporting a sufficient amount of functional material, the thickness of the partition wall 14 is 0.3 mm or less, the cell density is 100 cells/cm$^2$ or less, and the cell pitch is 1.0 mm or more. In a preferred embodiment, the thickness of the partition wall 14 is 0.125 mm or less, the cell density is 70 cells/cm$^2$ or less, and the cell pitch is 1.2 mm or more. In a more preferred embodiment, the thickness of the partition wall 14 is 0.100 mm or less, the cell density is 65 cells/cm$^2$ or less, and the cell pitch is 1.3 mm or more. In these embodiments, the thickness of the partition wall 14 is particularly preferably 0.080 mm or less.

In each of the above embodiments, from the viewpoints of ensuring the strength of the honeycomb structure 10 and maintaining lower electrical resistance, the lower limit of the thickness of the partition wall 14 is preferably 0.010 mm or more, and more preferably 0.020 mm or more, and even more preferably 0.030 mm or more.

In each of the above embodiments, from the viewpoints of ensuring the strength of the honeycomb structure 10, maintaining lower electrical resistance, and increasing a surface area to facilitate reaction, adsorption, and release, the lower limit of the cell density is 30 cells/cm$^2$ or more, and preferably 35 cells/cm$^2$ or more, and even more preferably 40 cells/cm$^2$ or more.

In each of the above embodiments, from the viewpoints of ensuring the strength of the honeycomb structure 10, maintaining lower electrical resistance and increasing a surface area to facilitate reaction, adsorption and release, the upper limit of the cell pitch is 2.0 mm or less, and more preferably 1.8 mm or less, and even more preferably 1.6 mm or less.

In an embodiment that is advantageous in terms of both reducing pressure loss and maintaining strength, the thickness of the partition wall 14 is 0.08 to 0.36 mm, the cell density is 2.54 to 140 cells/cm$^2$, and the opening ratio of the cells 13 is 0.70 or more. In a preferred embodiment, the thickness of the partition wall 14 is 0.09 to 0.35 mm, the cell density is 15 to 100 cells/cm$^2$, and the opening ratio of the cells 13 is 0.80 or more. In a more preferred embodiment, the thickness of the partition wall 14 is 0.14 to 0.30 mm, the cell density is 20 to 90 cells/cm$^2$, and the opening ratio of the cells 13 is 0.85 or more.

In each of the above embodiments, from the viewpoint of ensuring the strength of the honeycomb structure 10, the upper limit of the opening ratio of the cells 13 is preferably 0.94 or less, and more preferably 0.92 or less, and even more preferably 0.90 or less.

Although the thickness of the outer peripheral wall 11 is not particularly limited, it is preferably determined based on the following viewpoints. First, from the viewpoint of reinforcing the honeycomb structure 10, the thickness of the outer peripheral wall 11 is preferably 0.05 mm or more, and more preferably 0.06 mm or more, and even more preferably 0.08 mm or more. On the other hand, the thickness of the outer peripheral wall 11 is preferably 1.0 mm or less, and more preferably 0.5 mm, and more preferably 0.4 mm or less, and still more preferably 0.3 mm or less, from the viewpoint of suppressing the initial current by increasing the electrical resistance and from the viewpoint of reducing pressure loss when air flows.

As used herein, the thickness of the outer peripheral wall 11 refers to a length from a boundary between the outer peripheral wall 11 and the outermost cell 13 or the partition wall 14 to a side surface of the honeycomb structure 10 in a normal line direction of the side surface in the cross section orthogonal to the flow path direction.

The length of the honeycomb structure 10 in the flow path direction and the cross-sectional area orthogonal to the flow path direction may be adjusted according to the required size of the heater element 100, and are not particularly limited. For example, when used in a compact heater element 100 while ensuring a predetermined function, the honeycomb structure 10 can have a length of 2 to 20 mm in the flow path direction and a cross-sectional area of 10 $cm^2$ or more orthogonal to the flow path direction. Although the upper limit of the cross-sectional area orthogonal to the flow path direction is not particularly limited, it is, for example, 300 $cm^2$.

The partition walls 14 forming the honeycomb structure 10 are made of a material that can be heated by electric conduction, specifically made of a material having the PTC property. Further, the outer peripheral wall 11 may also be made of the material having the PTC property, as with the partition walls 14, as needed. By such a configuration, the functional material-containing layer 40 can be heated by heat transfer from the heat-generating partition walls 14 (and optionally the outer peripheral wall 11). Further, the material having the PTC property has characteristics such that when the temperature increases to exceed the Curie point, the resistance value is sharply increased, resulting in a difficult for electricity to flow. Therefore, when the temperature of the heater element 100 becomes high, the partition walls 14 (and the outer peripheral wall 11 if necessary) limit the current flowing through them, thereby suppressing excessive heat generation of the heater element 100. Therefore, it is possible to suppress thermal deterioration of the functional material-containing layer 40 due to excessive heat generation.

The lower limit of the volume resistivity at 25° C. of the material having the PTC property is preferably 0.5 Ω·cm or more, and more preferably 1 Ω·cm or more, and even more preferably 5 Ω·cm or more, from the viewpoint of obtaining appropriate heat generation. The upper limit of the volume resistivity at 25° C. of the material having the PTC property is preferably 30 Ω·cm or less, and more preferably 20 Ω·cm or less, and even more preferably 18 Ω·cm or less, and particularly preferably 16 Ω·cm or less, from the viewpoint of generating heat with a low driving voltage. As used herein, the volume resistivity at 25° C. of the material having the PTC property is measured according to JIS K 6271:2008.

From the viewpoints that can be heated by electric conduction and has the PTC property, the outer peripheral wall 11 and the partition walls 14 are preferably made of a material containing barium titanate ($BaTiO_3$) as a main component. Also, this material is more preferably ceramics made of a material containing barium titanate ($BaTiO_3$)-based crystals as a main component in which a part of Ba is substituted with a rare earth element. As used herein, the term "main component" means a component in which a proportion of the component is more than 50% by mass of the total component. The content of $BaTiO_3$-based crystalline particles can be determined by fluorescent X-ray analysis. Other crystalline particles can also be measured by the same method.

The compositional formula of $BaTiO_3$-based crystalline particles, in which a part of Ba is substituted with the rare earth element, can be expressed as $(Ba_{1-x}A_x)TiO_3$. In the compositional formula, the symbol A represents at least one rare earth element, and $0.001 \leq x \leq 0.010$.

The symbol A is not particularly limited as long as it is the rare earth element, but it may preferably be one or more selected from the group consisting of La, Ce, Pr, Nd, Eu, Gd, Dy, Ho, Er, Y and Yb, and more preferably La. The x value is preferably 0.001 or more, and more preferably 0.0015 or more, in terms of suppressing excessively high electrical resistance at room temperature. On the other hand, x is preferably 0.009 or less, in terms of preventing the electrical resistance at room temperature from becoming too high due to insufficient sintering.

The content of the $BaTiO_3$-based crystalline particles in which a part of Ba is substituted with the rare earth element in the ceramics is not particularly limited as long as it is determined to be the main component, but it may preferably be 90% by mass or more, and more preferably 92% by mass or more, and even more preferably 94% by mass or more. The upper limit of the content of the $BaTiO_3$-based crystalline particles is not particularly limited, but it may generally be 99% by mass, and preferably 98% by mass.

The content of the $BaTiO_3$-based crystalline particles can be measured by fluorescent X-ray analysis. Other crystalline particles can be measured in the same manner as this method.

In terms of reduction of the environmental load, it is desirable that the materials used for the outer peripheral wall 11 and the partition walls 14 are substantially free of lead (Pb). More particularly, the outer peripheral wall 11 and the partition walls 14 preferably have a Pb content of 0.01% by mass or less, and more preferably 0.001% by mass or less, and still more preferably 0% by mass. The lower Pb content can allow the air heated by contact with the heat-generating partition walls 14 to be safely applied to organisms such as humans, for example. In the outer peripheral wall 11 and the partition walls 14, the Pb content is preferably less than 0.03% by mass, and more preferably less than 0.01% by mass, and further preferably 0% by mass, as converted to PbO. The lead content can be determined by ICP-MS (inductively coupled plasma mass spectrometry).

The material making up the outer peripheral wall 11 and the partition walls 14 preferably have a lower limit of a Curie point of 100° C. or more, and more preferably 110° C. or more, and even more preferably 125° C. or more, in terms of efficiently heating the air. Further, the upper limit of the Curie point is preferably 250° C. or more, and preferably 225° C. or more, and even more preferably 200° C. or more, and still more preferably 150° C. or more, in terms of safety as a component placed in the vehicle interior or near the vehicle interior.

The Curie point of the material making up the outer peripheral wall 11 and the partition walls 14 can be adjusted by the type of shifter and an amount of the shifter added. For example, the Curie point of barium titanate ($BaTIO_3$) is about 120° C., but the Curie point can be shifted to the lower temperature side by substituting a part of Ba and Ti with one or more of Sr, Sn and Zr.

As used herein, the Curie point is measured by the following method. A sample is attached to a sample holder for measurement, mounted in a measuring tank (e.g., MINI-SUBZERO MC-810P, from ESPEC), and a change in electrical resistance of the sample as a function of a temperature change when the temperature is increased from 10° C. is measured using a DC resistance meter (e.g., Multimeter 3478A, from YOKOGAWA HEWLETT PACKARD, LTD.). Based on an electrical resistance-temperature plot obtained by the measurement, a temperature at which the resistance value is twice the resistance value at room temperature (20° C.) is defined as the Curie point.

(1-2. First Electrode and Second Electrode)

The first electrode 20 is provided on the first end face 12*a* side of the honeycomb structure 10, and the second electrode 30 is provided on the second end face 12*b* side of the honeycomb structure 10.

The first electrode 20 includes an electrode portion A1 provided on the first end face 12*a*, and an electrode portion B1 connected to the electrode portion A1 and provided on the surfaces of the partition walls 14 in the extending direction of the flow path from the first end face 12*a*. The second electrode 30 includes an electrode portion A2 provided on the second end face 12*b*, and an electrode portion B2 connected to the electrode portion A2 and provided on the surfaces of the partition walls 14 in the extending direction of the flow path from the second end face 12*b*.

The above configuration allows a distance between the first electrode 20 and the second electrode 30 in the extending direction of the flow path to be shortened as compared with the case where the first electrode 20 and the second electrode 30 are provided only on the first end face 12*a* and the second end face 12*b*, respectively. When the distance between the electrodes is shortened, the electric resistance is lowered, so that it is possible to widen the region in the extending direction of the flow path, which can be effectively heated.

When the heater element 100 is used in an environment where moisture such as rainwater is present, a longer distance L1 between the electrode portion B1 and the electrode portion B2 results in adhesion of more moisture to the electrodes (the first electrodes 20 and the second electrodes 30), which will easily corrode the electrodes. Therefore, a shorter distance L1 between the electrode portion B1 and the electrode portion B2 is preferable. Further, as described above, the shorter the distance L1 between the electrode portion B1 and the electrode portion B2, the lower the electrical resistance. Therefore, it is possible to widen the region in the extending direction of the flow path, which can be effectively heated. From these viewpoints, the distance L1 between the electrode portion B1 and the electrode portion B2 is controlled to be 97% or less, preferably 95% or less, more preferably 90%, of the length L3 of the honeycomb structure 10 in the extending direction of the flow path.

Figure 3:
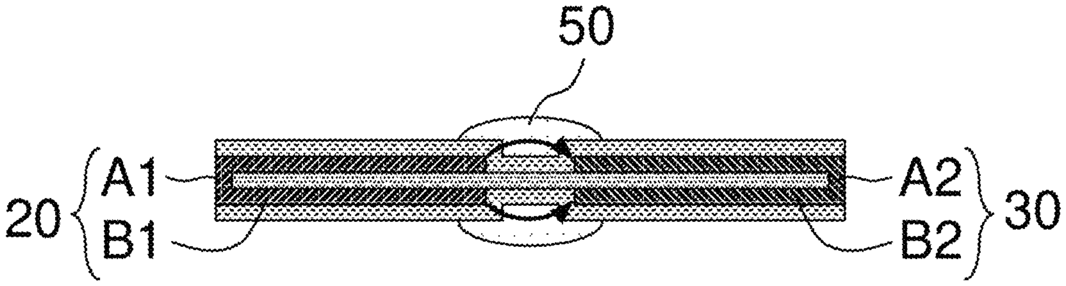
FIG. 3 is a schematic view for explaining a state where moisture adheres when a distance L1 between an electrode portion B1 and an electrode portion B2 is too short.

On the other hand, if the distance L1 between the electrode portion B1 and the electrode portion B2 is too short, as shown in FIG. 3, moisture 50 may adhere to a portion between the electrode portion B1 and the electrode portion B2 when the heater element 100 is used in the environment where moisture such as rainwater is present. In such a case, the first electrode 20 and the second electrode 30 are electrically connected via the moisture 50, resulting in a short circuit. Therefore, the distance L1 between the electrode portion B1 and the electrode portion B2 is controlled to be 30% or more, preferably 50% or more, more preferably 60% or more, of the length L3 of the honeycomb structure 10 in the extending direction of the flow path.

A flow path direction length $D_{B1}$ of the electrode portion B1 and a flow path direction length $D_{B2}$ of the electrode portion B2 are not particularly limited as long as the distance L1 between the electrode portion B1 and the electrode portion B2 satisfies the above range. In a typical embodiment, the flow path direction lengths $D_{B1}$ and $D_{B2}$ are preferably 1.5 to 35%, and 2.5 to 32%, even more preferably 5 to 30%, of the length L3 of the honeycomb structure 10 in the extending direction of the flow path.

In the heater element 100, the air may flow through the cells 13 with the first end face 12*a* being on the upstream side and the second end face 12*b* being on the downstream side, or the air may flow through the cells 13 with the first end face 12*a* being on the downstream side and the second end face 12*b* being on the downstream side. However, the upstream portion of the heater element 100 is cooled by the cold inflow air, while the downstream portion is not cooled because the inflow air is heated. Therefore, since the downstream portion is sufficiently heated by heat conduction, the downstream portion can be sufficiently heated even if current does not flow through the honeycomb structure 10 in the downstream portion and electricity flows through the electrodes provided in the extending direction of the flow path. Therefore, it is preferable that the air is circulated into the cells 13 of the heater element 100 such that the end faces having electrodes with a shorter average length of the $D_{B1}$ and $D_{B2}$ are on the upstream side and the end faces having the electrodes with a longer average length are on the downstream side, because the region in the extending direction of the flow path where the functional material-containing layer 40 can be effectively heated can be further widened.

The distance L1 between the electrode portion B1 and the electrode portion B2, the flow path direction length $D_{B1}$ of the electrode portion B1, and the flow path direction length $D_{B2}$ of the electrode portion B2 are measured by the following procedure.

First, a cross-sectional image of the heater element 100 at magnifications of about 50 is acquired using a scanning electron microscope or the like. The cross section is a cross section parallel to the flow path direction of the honeycomb structure 10 as illustrated in FIGS. 1B and 2B. Moreover, the cross section is made to pass through the center of gravity position in the cross section orthogonal to the flow path of the honeycomb structure 10.

Subsequently, when the distance L1 between the electrode portion B1 and the electrode portion B2 is determined, all the distances L1 in the cross-sectional image are measured and an average value thereof is determined. Also, when the flow path direction length $D_{B1}$ of the electrode portion B1 is determined, all the lengths of the electrode portions B1 in the flow path direction in the cross-sectional image are determined, and an average value thereof is determined. Also, when the flow path direction length $D_{B2}$ of the electrode portion B2 is determined, all the lengths of the electrode portions B2 in the flow path direction in the cross-sectional image are determined, and an average value thereof is determined.

The distance L2 between the electrode portion B1 and the electrode portion B2 facing each other through the cell 13 is preferably 30 to 97%, more preferably 50 to 95%, even more preferably 60 to 90%, of a hydraulic diameter of the cell 13, although particularly limited thereto. The control of the distance L2 to such a range can prevent foreign matters from entering the cells 13 of the heater element 100 to obstruct air circulation.

Here, the hydraulic diameter of the cell 13 as used herein is a value (P−t) determined by subtracting a thickness t (mm) of the partition wall 14 from the cell pitch P (mm) described above.

Also, the distance L2 between the electrode portions B1 and between the electrode portions B2, which face each other through the cell 13, is measured by the same procedure as that of the distance L1 between the electrode portion B1 and the electrode portion B2. Specifically, all the distances L2 in the same cross-sectional image as described above are measured, and an average value thereof is determined.

By applying a voltage between the first electrode 20 and the second electrode 30, the heat can be generated in the honeycomb structure 10 by Joule heat. Each of the first electrode 20 and the second electrode 30 may have an extending portion extending toward the outside of the honeycomb structure 10. The provision of the extending portion can facilitate connection with a connector that is in charge of connection with the outside.

Each of the first electrode 20 and the second electrode 30 may employ, for example, a metal or alloy containing at least one selected from Cu, Ag, Al, Ni and Si, although not particularly limited thereto. It is also possible to use an ohmic electrode capable of ohmic contact with the outer peripheral wall 11 and/or the partition walls 14 which have the PTC property. The ohmic electrode may employ an ohmic electrode containing, for example, at least one selected from Al, Au, Ag and In as a base metal, and containing at least one selected from Ni, Si, Zn, Ge, Sn, Se and Te for n-type semiconductors as a dopant. Further, each of the first electrode 20 and the second electrode 30 may have a single-layer structure, or may have a laminated structure of two or more layers. When each of the first electrode 20 and the second electrode 30 has the laminated structure of two or more layers, the materials of the respective layers may be of the same type or of different types.

The thickness of each of the first electrode 20 and the second electrode 30 is not particularly limited, and it may be appropriately set according to the method for forming the first electrode 20 and the second electrode 30. The method for forming the first electrode 20 and the second electrode 30 includes metal deposition methods such as sputtering, vapor deposition, electrolytic deposition, and chemical deposition. Alternatively, the first electrode 20 and the second electrode 30 can be formed by applying an electrode paste and then baking it, or by thermal spraying. Furthermore, the first electrode 20 and the second electrode 30 may be formed by joining metal sheets or alloy sheets.

Each of the thicknesses of the electrode portion A1 of the first electrode 20 and the electrode portion B1 of the second electrode 30 is about 5 to 80 μm for baking the electrode paste, and about 100 to 1000 nm for dry plating such as sputtering and vapor deposition, and about 10 to 100 μm for thermal spraying, and about 5 μm to 30 μm for wet plating such as electrolytic deposition and chemical deposition, although not particularly limited thereto. Further, when joining the metal sheet or alloy sheet, each of the thicknesses is preferably about 5 to 100 μm.

Although each of the thicknesses of the electrode portion B1 of the first electrode 20 and the electrode portion B2 of the second electrode 30 is not particularly limited, a higher thickness is desirable in terms of ensuring electrical continuity, but a lower thickness is advantageous in that ventilation resistance of inflow air can be reduced. Therefore, each of the thicknesses of the electrode portions B1 and B2 is preferably $1/10{,}000$ to $1/10$, more preferably $1/1{,}000$ to $1/20$, of the hydraulic diameter of the cell 13.

Each of the thicknesses of the electrode portion B1 of the first electrode 20 and the electrode portion B2 of the second electrode 30 is measured by the following procedure. First, a cross-sectional image of the heater element 100 at magnifications of about 50 is acquired using a scanning electron microscope or the like. The cross section is a cross section parallel to the flow path direction of the honeycomb structure 10 as illustrated in FIGS. 1B and 2B. Also, this cross section is made to pass through the center of gravity position in the cross section orthogonal to the flow path of the honeycomb structure 10. For each of the electrode portion B1 and the electrode portion B2 visually recognized from the cross-sectional image, the thickness is calculated by dividing a cross-sectional area by the length of the cells 13 in the extending direction of the flow path. This calculation is performed for all of the electrode portions B1 of the first electrode 20 and the electrode portions B2 of the second electrode 30, which are visually recognized from the cross-sectional image, and the overall average values are determined to be the thicknesses of the electrode portion B1 of the first electrodes 20 and the electrode portion B2 of the second electrodes 30.

In the heater element 100, the electrode portions B1 and B2 are continuously provided over a predetermined length on the entire surface of all the partition walls 14 that define the cells 13. In other words, when the heater element 100 is observed in a cross section orthogonal to the flow path direction in the region of the predetermined length, all the partition walls 14 defining the cells 13 (the partition walls 14 defining the outermost cells 13 and the outer peripheral wall 11) are covered over the whole circumference by the electrode portions B1 of the first electrode 20 or the electrode portions B2 of the second electrode 30 (FIGS. 1B and 2B). Such a configuration allows the distance between the electrodes to be uniformly shortened in all the cells 13. This makes it easier for the heater element 100 to generate heat uniformly.

However, the electrode portion B1 of the first electrode 20 or the electrode portion B2 of the second electrode 30 may have a portion that does not cover the partition wall 14 when the heater element 100 is observed in the cross section orthogonal to the flow path direction in the region of the predetermined length. That is, the electrode portions B1 and B2 can be continuously provided over the predetermined length on the surface of a part of the partition walls 14 that define the cells 13. Specifically, the electrode portions B1 and B2 may be continuously provided over the predetermined length on the surface of a part of all the partition walls 14 that define the cells 13, or the electrode portions B1 and B2 may be continuously provided over a predetermined length on a part of the surface of a part of the partition walls 14 that define the cells 13 or on the entire surface.

Referring now to FIGS. 4A to 4D, they show schematic views of cross sections orthogonal to the flow path direction of heater elements according to several other embodiments where the electrode portions B1 of the first electrodes 20 or the electrode portions B2 of the second electrodes 30 have different structures. FIGS. 4A to 4D each corresponds to the cross section taken along the line a-a' in FIG. 1A. Further, the cross section corresponding to the b-b' line in FIG. 1A is omitted because the electrode portion B1 of the first electrode 20 only changes to the electrode portion B2 of the second electrode 30.

Figure 4A:
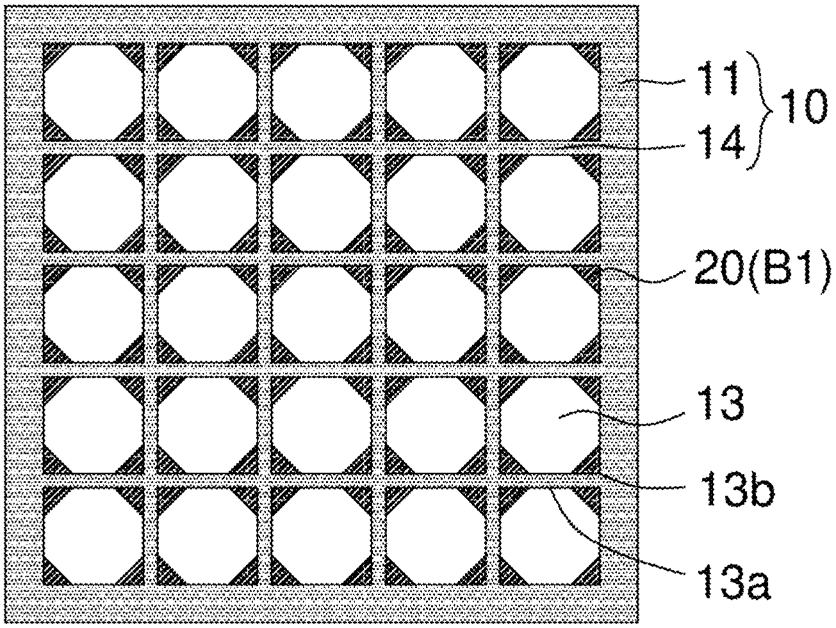
FIG. 4A is a schematic view of a cross section according to another embodiment of the present invention, which is orthogonal to a flow path direction of a heater element.

In the embodiment of FIG. 4A, all the cells 13 are provided with the electrode portions B1, B2. Further, the partition wall 14 that defines each cell 13 (in the case of the outermost cells 13, the partition walls 14 that define the outermost cells 13 and the outer peripheral wall 11) have a rectangular cross section, and all corner portions 13*b* are covered by the electrode portions B1, B2. On the other hand, all of side portions 13*a* other than the corner portions 13*b* are not covered with the electrode portions B1, B2.

Figure 4B:
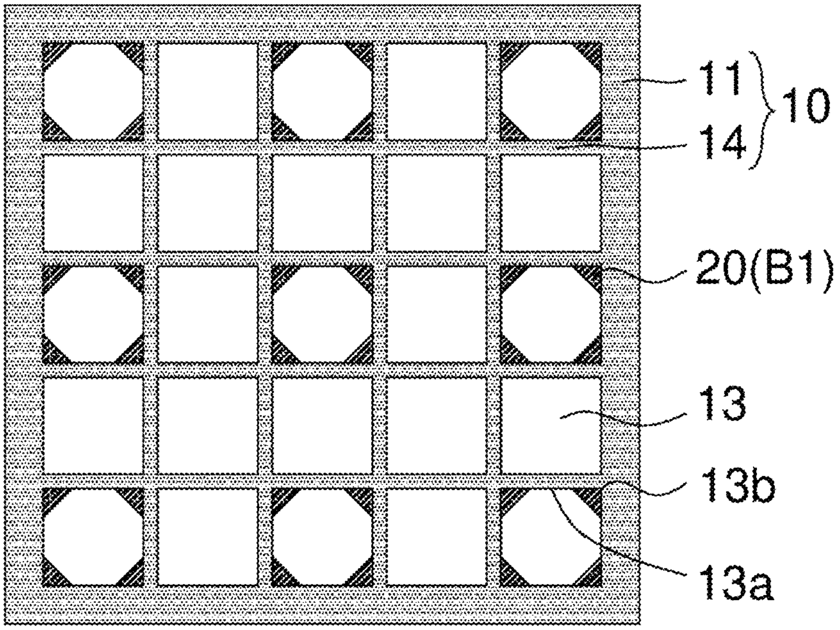
FIG. 4B is a schematic view of a cross section according to another embodiment of the present invention, which is orthogonal to a flow path direction of a heater element.

In the embodiment of FIG. 4B, some cells 13 are provided with the electrode portions B1, B2. Further, the partition wall 14 that defines each cell 13 in which the electrode portions B1, B2 are provided (in the case of the outermost cells 13 in which the electrode portions B1, B2 are provided, the partition walls 14 that define the outermost cells 13 and the outer peripheral wall 11) has a rectangular cross section, and all the corner portions 13*b* are covered with the electrode portions B1, B2. On the other hand, none of the side portions 13*a* other than the corner portions 13*b* is covered with the electrode portions B1, B2. In addition, when some cells 13 are provided with the electrode portions B1, B2, it is preferable that in the cross section orthogonal to the flow path direction, the electrode portions B1, B2 are provided point-symmetrically with the central axis as the center of symmetry, or the electrode portions B1, B2 are provided line-symmetrically with any line segment passing through the central axis as the center of symmetry, in terms of heat generation uniformity.

Figure 4C:
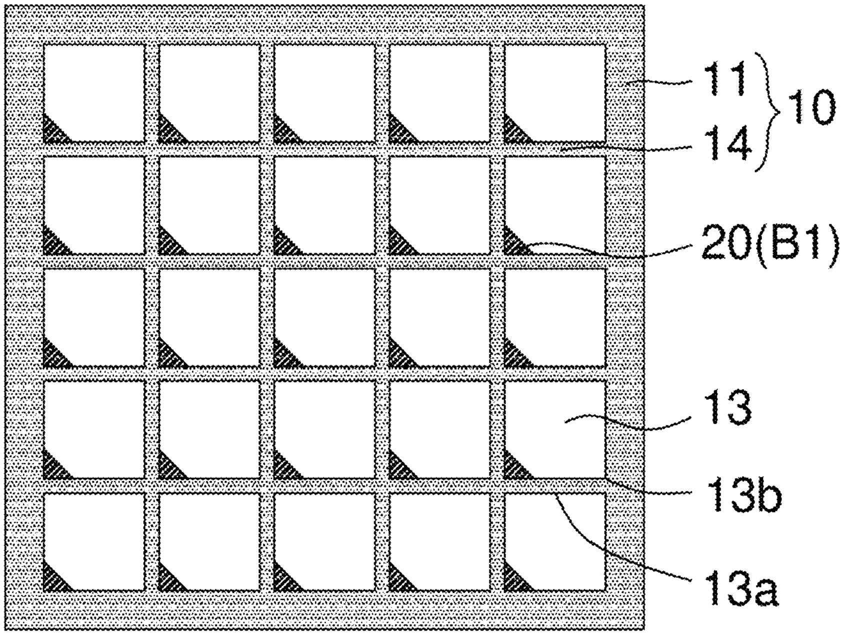
FIG. 4C is a schematic view of a cross section according to another embodiment of the present invention, which is orthogonal to a flow path direction of a heater element.

In the embodiment of FIG. 4C, all the cells 13 are provided with the electrode portions B1, B2. Further, the partition wall 14 that defines each cell 13 (in the case of the outermost cells 13, the partition walls 14 that define the outermost cells 13 and the outer peripheral wall 11) has a rectangular cross section, and only one corner portion 13*b* is covered with the electrode portions B1, B2. On the other hand, all portions other than one corner portion 13*b* are not covered with the electrode portions B1, B2.

Figure 4D:
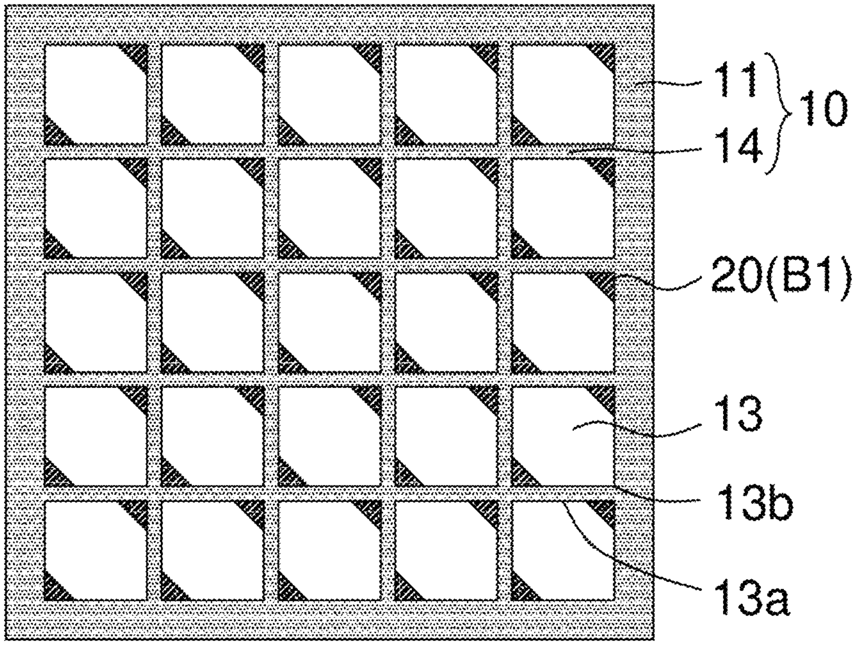
FIG. 4D is a schematic view of a cross section according to another embodiment of the present invention, which is orthogonal to a flow path direction of a heater element.

In the embodiment of FIG. 4D, all the cells 13 are provided with the electrode portions B1, B2. Also, the partition wall 14 that defines each cell 13 (in the case of the outermost cells 13, the partition walls 14 that define the outermost cells 13 and the outer peripheral wall 11) has a quadrangular cross section, and only a pair of opposing corner portions 13*b* are covered with the electrode portions B1, B2. On the other hand, all portions other than the pair of opposing corner portions 13*b* are not covered with the electrode portions B1, B2.

(1-3. Functional Material-Containing Layer)

The functional material-containing layer 40 can be provided on the surfaces of the partition walls 14 (in the case of the outermost cells 13, the partition walls 14 that define the outermost cells 13 and the outer peripheral wall 11) on which the electrode portions B1, B2 are not provided. Further, the functional material-containing layer 40 may be provided on the surfaces of the electrode portions B1, B2. By thus providing the functional material-containing layer 40, the functional material can be easily heated, so that the functional material can exert its desired functions.

The functional material contained in the functional material-containing layer 40 is not particularly limited as long as it is a material that can exhibit a desired function, and examples that can be used herein include adsorbents, catalysts, and the like. The adsorbent preferably has a function of adsorbing one or more components selected from components to be removed in the air, such as water vapor, carbon dioxide, and volatile components. In addition, it is also preferable to have a function of adsorbing harmful volatile components. Also, the use of the catalyst can purify the components to be removed. Furthermore, the adsorbent and the catalyst may be used together for the purpose of enhancing the function of the absorbent to capture the components to be removed.

The adsorbent preferably has a function that can adsorb the components to be removed, such as water vapor, carbon dioxide and volatile components at −20 to 40° C. and release them at an elevated temperature of 60° C. or more. Examples of the adsorbent having such functions include zeolite, silica gel, activated carbon, alumina, silica, low-crystalline clay, amorphous aluminum silicate complexes, and the like. The type of the adsorbent may be appropriately selected depending on the types of the components to be removed. The adsorbent may be used alone, or in combination with two or more types.

The catalyst preferably has a function capable of promoting the oxidation-reduction reaction. The catalysts having such functions include metal catalysts such as Pt, Pd and Ag, and oxide catalysts such as $CeO_2$ and $ZrO_2$. The catalyst may be used alone, or in combination with two or more types.

The volatile components contained in the air in the vehicle interior include, for example, volatile organic compounds (VOCs), and odor components other than the VOCs Specific examples of the volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, and di-2-ethylhexyl phthalate, diazinon, acetaldehyde, 2-(1-methylpropyl)phenyl N-methylcarbamate, and the like.

The thickness of the functional material-containing layer 40 may be determined according to the size of the cells 13, and is not particularly limited. For example, the thickness of the functional material-containing layer 40 is preferably 20 μm or more, and more preferably 25 μm or more, and even more preferably 30 μm or more, from the viewpoint of ensuring sufficient contact with air. On the other hand, the thickness of the functional material-containing layer 40 is preferably 400 μm or less, and more preferably 380 μm or less, and even more preferably 350 μm or less, from the viewpoint of suppressing separation of the functional material-containing layer 20 from the partition walls 14 and the outer peripheral wall 11.

The thickness of the functional material-containing layer 40 is measured using the following procedure. Any cross section parallel to the flow path direction of the honeycomb structure 10, as illustrated in FIG. 2B, is cut out, and a cross-sectional image at magnifications of about 50 is acquired using a scanning electron microscope or the like. Also, this cross section is made to pass through the center of gravity position in the cross section orthogonal to the flow path of the honeycomb structure 10. The thickness of each functional material-containing layer 40 visually recognized from the cross-sectional image is calculated by dividing the cross-sectional area by the length of the cells 13 in the flow path direction. This calculation is performed for all the functional material-containing layers 40 visually recognized from the cross-sectional image, and an average value thereof is determined to be the thickness of the functional material-containing layer 40.

From the viewpoint that the functional material exhibits a desired function in the heater element 100, an amount of the functional material-containing layer 40 is preferably 50 to 500 g/L, and more preferably 100 to 400 g/L, and even more preferably 150 to 350 g/L, based on the volume of the honeycomb structure 10. It should be noted that the volume of the honeycomb structure 10 is a value determined by the external dimensions of the honeycomb structure 10.

(2. Method for Producing Heater element)

The method for producing the heater element 100 according to the embodiment of the present invention is not particularly limited as long as it is the method having the above features, and it can be performed according to a known method. Hereinafter, the method for producing the heater element 100 according to an embodiment of the present invention will be illustratively described.

A method for producing the honeycomb structure 10 forming the heater element 100 includes a forming step and a firing step.

In the forming step, a green body containing a ceramic raw material including $BaCO_3$ powder, $TiO_2$ powder, and rare earth nitrate or hydroxide powder is formed to prepare a honeycomb formed body having a relative density of 60% or more.

The ceramic raw material can be obtained by dry-mixing the powders so as to have a desired composition.

The green body can be obtained by adding a dispersion medium, a binder, a plasticizer and a dispersant to the ceramic raw material and kneading them. The green body may optionally contain additives such as shifters, metal oxides, property improving agents, and conductor powder.

The blending amount of the components other than the ceramic raw material is not particularly limited as long as the relative density of the honeycomb formed body is 60% or more.

As used herein, the "relative density of the honeycomb formed body" means a ratio of the density of the honeycomb formed body to the true density of the entire ceramic raw material. More particularly, the relative density can be determined by the following equation:

relative density of honeycomb formed body (%)=density of honeycomb formed body (g/cm$^3$)/true density of entire ceramic raw material (g/cm$^3$)×100.

The density of the honeycomb formed body can be measured by the Archimedes method using pure water as a medium. Further, the true density of the entire ceramic raw material can be obtained by dividing the total mass of the respective raw materials (g) by the total volume of the actual volumes of the respective raw materials (cm$^3$).

Examples of the dispersion medium include water or a mixed solvent of water and an organic solvent such as alcohol, and more preferably water.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binder may be used alone, or in combination of two or more, but it is preferable that the binder does not contain an alkali metal element.

Examples of the plasticizer include polyoxyalkylene alkyl ethers, polycarboxylic acid-based polymers, and alkyl phosphate esters.

The dispersant that can be used herein includes surfactants such as polyoxyalkylene alkyl ether, ethylene glycol, dextrin, fatty acid soaps, and polyalcohol. The dispersant may be used alone or in combination of two or more.

The honeycomb formed body can be produced by extrude the green body.

In the extrusion, a die having a desired overall shape, cell shape, partition wall thickness, cell density and the like can be used.

The relative density of the honeycomb formed body obtained by extrusion is 60% or more, and preferably 65% or more. By controlling the relative density of the honeycomb formed body to such a range, the honeycomb formed body can be densified and the electrical resistance at room temperature can be reduced. The upper limit of the relative density of the honeycomb formed body is not particularly limited, but it may generally be 80%, and preferably 75%.

The honeycomb formed body can be dried before the firing step. Non-limiting examples of the drying method include conventionally known drying methods such as hot air drying, microwave drying, dielectric drying, drying under reduced pressure, drying in vacuum, and freeze drying. Among these, a drying method that combines the hot air drying with the microwave drying or dielectric drying is preferable in that the entire formed body can be rapidly and uniformly dried.

The firing step includes maintaining the formed body at a temperature of from 1150 to 1250° C., and then increasing the temperature to a maximum temperature of from 1360 to 1430° C. at a heating rate of 20 to 600° C./hour, and maintaining the temperature for 0.5 to 10 hours.

The maintaining of the honeycomb formed body at the maximum temperature of from 1360 to 1430° C. for 0.5 to 10 hours can provide the honeycomb structure 10 containing, as a main component, $BaTiO_3$-based crystal particles in which a part of Ba is substituted with the rare earth element.

Further, the maintaining at the temperature of from 1150 to 1250° C. can allow the $Ba_2TiO_4$ crystal particles generated in the firing process to be easily removed, so that the honeycomb structure 10 can be densified.

Further, the heating rate of 20 to 600° C./hour from the temperature of 1150 to 1250° C. to the maximum temperature of 1360 to 1430° C. can allow 1.0 to 10.0% by mass of $Ba_6Ti_{17}O_{40}$ crystal particles to be formed in the honeycomb structure 10.

The maintaining time at 1150 to 1250° C. is not particularly limited, but it may preferably be from 0.5 to 10 hours. Such a maintaining time can lead to stable and easy removal of $Ba_2TiO_4$ crystal particles generated in the firing process.

The firing step preferably includes maintaining at 900 to 950° C. for 0.5 to 5 hours during the increasing of the temperature. The maintaining at 900 to 950° C. for 0.5 to 5 hours can lead to sufficient decomposition of $BaCO_3$, so that the honeycomb structure 10 having a predetermined composition can be easily obtained.

Prior to the firing step, a degreasing step for removing the binder may be performed. The degreasing step may preferably be performed in an air atmosphere in order to decompose the organic components completely.

Also, the atmosphere of the firing step may preferably be the air atmosphere in terms of control of electrical characteristics and production cost.

A firing furnace used in the firing step and the degreasing step is not particularly limited, but it may be an electric furnace, a gas furnace, or the like.

By forming a pair of electrodes (the first electrode 20 and the second electrode 30) on the honeycomb structure 10 thus obtained, the heater element 100 can be produced. The pair of electrodes can also be formed by metal deposition methods such as sputtering, vapor deposition, electrolytic deposition, and chemical deposition. Further, the pair of electrodes can also be formed by applying an electrode paste and then baking it. Furthermore, the pair of electrodes can also be formed by thermal spraying. The pair of electrodes may be composed of a single layer, but may also be composed of a plurality of electrode layers having different compositions. A typical method for forming the pair of electrodes will be described below.

First, an electrode slurry containing an electrode material, an organic binder, and a dispersion medium is prepared, and the honeycomb structure 10 is immersed in the slurry from the first end face 12*a* or the second end face 12*b* to a desired depth in the flow path direction of the honeycomb structure 10. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. An excess slurry on the periphery of the honeycomb structure 10 is removed by blowing and wiping. The slurry can be then dried to form the electrode portions B1, B2 on the surfaces of the partition walls 14 and the like, and form the electrode portions A1, A2 on the first end face 12*a* or the second end face 12*b* of the honeycomb structure 10. The electrode portions A1, A2 may be separately formed by the method as described above. The drying can be performed while heating the heater element 100 to a temperature of about 120 to 600° C., for example. Although a series of steps of immersion, slurry removal, and drying may be performed only once, the steps can be repeated multiple times to provide the electrode portions A1, A2 and the electrode portions B1, B2 having desired thicknesses.

The surface tension varies depending on the viscosity of the slurry, whereby the covering state of the side portions 13*a* and the corner portions 13*b* of the partition walls 14 defining the cells 13 (the partition walls 14 that define the outermost cells 13 and the outer peripheral wall 11) by the electrode portions B1, B2 can be changed. For example, when the entire surface of the partition walls 14 is covered as shown in FIGS. 1B and 2B, the viscosity of the electrode slurry may be relatively low. As shown in FIGS. 4A to 4D, when only the corner portions 13*b* of the partition walls 14 are covered, the viscosity of the electrode slurry may be relatively high. The difference among FIGS. 4A to 4D can be made by, for example, masking the first end face 12*a* or the second end face 12*b* of the honeycomb structure 10 when the honeycomb structure 10 is immersed in the electrode slurry. Examples of the masking method include a method of attaching a resin sheet to the first end face 12*a* or the second end face 12*b* of the honeycomb structure 10, and forming holes in the resin sheet at locations corresponding to the cells 13 where the electrode portions B1, B2 are to be formed, by means of a laser.

The functional material-containing layer 40 can be then formed on the surfaces of the partition walls 14 and the like of the heater element 100 thus obtained to provide the heater element 100 with the functional material-containing layer 40.

Although the method for forming the functional material-containing layer 40 is not particularly limited, it can be formed, for example, by the following steps. The heater element 100 is immersed in a slurry containing a functional material, an organic binder, and a dispersion medium for a predetermined period of time, and an excess slurry on the end faces and the outer periphery of the honeycomb structure 10 is removed by blowing and wiping. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. The slurry can be then dried to form the functional material-containing layer 40 on the surfaces of the partition walls 14 and the like. The drying can be performed while heating the heater element 100 to a temperature of about 120 to 600° C., for example. Although a series of steps of immersion, slurry removal, and drying may be performed only once, the steps can be repeated multiple times to provide the functional material-containing layer 40 having the desired thickness on the surfaces of the partition walls 14 and the like.

(3. Vehicle Interior Purification System)

According to an embodiment of the present invention, a vehicle interior purification system including the heater element 100 as described above is provided. The vehicle interior purification system can be suitably used for various vehicles such as automobiles.

Figure 5:
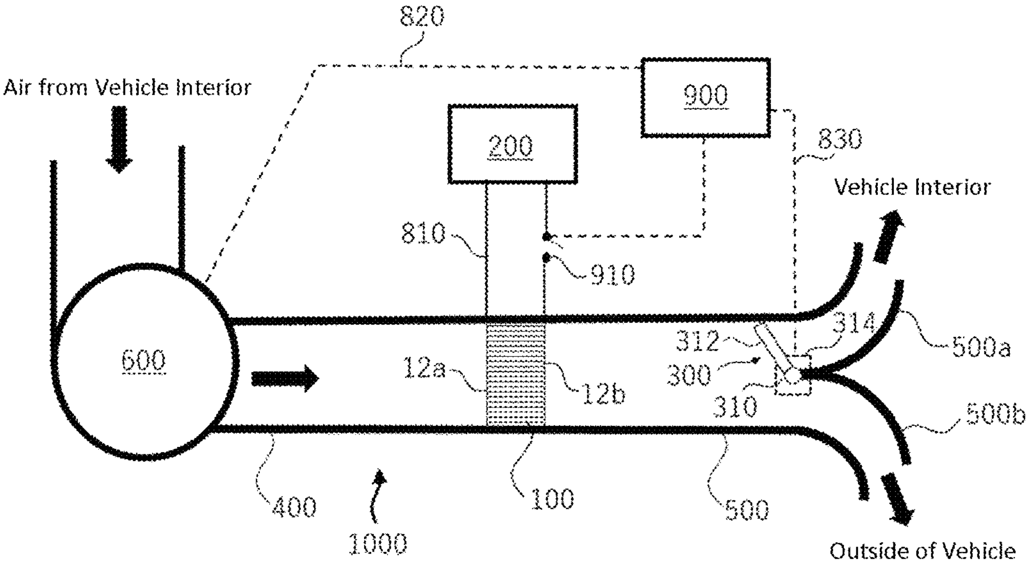
FIG. 5 is a schematic view illustrating a structure of a vehicle interior purification system according to an embodiment of the present invention.

FIG. 5 is a schematic view illustrating a structure of a vehicle interior purification system according to an embodiment of the present invention.

As shown in FIG. 5, a vehicle interior purification system 1000 includes: at least one heater element 100; a power supply 200 such as a battery for applying voltage to the heater element 100; an inflow pipe 400 that communicates the vehicle interior with the first end face 12*a* of the heater element 100; an outflow pipe 500 having a first path 500*a* communicating the second end face 12*b* of the heater element 100 with the vehicle interior; and a ventilator 600 for causing air from the vehicle interior to flow into the first end face 12*a* of the heater element 100 via the inflow pipe 400.

The outflow pipe 500 can have, in addition to the first path 500*a*, a second path 500*b* that communicates the second end face 12*b* of the heater element 100 with the outside of the vehicle. Also, the outflow pipe 500 can have a switching valve 300 capable of switching the flow of the air flowing through the outflow pipe 500 between the first path 500*a* and the second path 500*b*.

The vehicle interior purification system 1000 can have operation modes: a first mode where the voltage applied from the power supply 200 is turned off, the switching valve 300 is switched such that the air flowing through the outflow pipe 500 passes through the first path 500*a*, and the ventilator 600 is turned on; and a second mode where the voltage applied from the power supply 200 is turned on, the switching valve 300 is switched so that the air flowing through the outflow pipe 500 passes through the second path 500*b*, and the ventilator 600 is turned on.

The vehicle interior purification system 1000 can include a control unit 900 that can execute the switching between the first mode and the second mode. For example, the control unit 900 may be configured to be able to alternately execute the first mode and the second mode. By repeating the switching between the first mode and the second mode in a constant cycle, the components to be removed can be stably discharged from the vehicle interior to the outside of the vehicle.

In the first mode, the air in the vehicle interior is purified. Specifically, the air from the vehicle interior flows in from the first end face 12*a* of the heater element 100 through the inflow pipe 400, passes through the interior of the heater element 100, and then flows out from the second end face 12*b* of the heater element 100. The components to be removed from the air from the vehicle interior are removed such as by capturing them by the functional material while passing through the heater element 100. The clean air flowing out from the second end face 12*b* of the heater element 100 is returned to the vehicle interior through the first path 500*a* of the outflow pipe 500.

In the second mode, the functional material is regenerated. Specifically, the air from the vehicle interior flows in from the first end face 12*a* of the heater element 100 through the inflow pipe 400, passes through the interior of the heater element 100, and then flows out from the second end face 12*b* of the heater element 100. The heater element 100 generates the heat by electric conduction, whereby the functional material supported by the heater element 100 is heated. Therefore, the components to be removed that are captured by the functional material are released from or allowed to react with the functional material.

In order to promote the releasing of the components to be removed that have been captured by the functional material, it is preferable to heat the functional material to a release temperature or higher depending on the type of the functional material. For example, when the adsorbent is used as the functional material, at least a part, preferably the whole, of the functional material is preferably heated to 70 to 150° C., and more preferably 80 to 140° C., and even more preferably 90 to 130° C. Further, it is desirable that the second mode is carried out for a period of time until the functional material is sufficiently regenerated. For example, when the adsorbent is used as the functional material, in the second mode, the functional material is preferably heated in the above temperature range for 1 to 10 minutes, and more preferably heated for 2 to 8 minutes, and even more preferably heated for 3 to 6 minutes, although it depends on the type of the functional material.

The air from the vehicle interior flows out from the second end face 12*b* of the heater element 100 while accompanying the components to be removed that have released from the functional material. The air containing the components to be removed that have flowed out from the second end face 12*b* of the heater element 100 is discharged to the outside of the vehicle through the second path 500*b* of the outflow pipe 500.

The switching between turning-on and turning-off of the voltage applied to the heater element 100 can be achieved, for example, by electrically connecting the power supply 200 to the first electrode 20 and the second electrode 30 of the heater element 100 with electric wires 810, and operating a power switch 910 provided in the middle of the electric wire 810. For the operation of the power switch 910, the control unit 900 can be operated.

The switching between turning-on and turning-off of the ventilator 600 can be achieved, for example, by electrically connecting the control unit 900 to the ventilator 600 with an electric wire 820 or wirelessly, and operating a power switch (not shown) by the control unit 900. The ventilator 600 can also be configured such that an amount of ventilation can be changed by the control unit 900.

The switching valve 300 can be switched, for example, by electrically connecting the control unit 900 to the switching valve 300 with an electric wire 830 or wirelessly, and operating a switch (not shown) of the switching valve 300 by the control unit 900.

The switching valve 300 is not particularly limited as long as it is electrically driven and has a function of switching the flow path, but examples thereof include an electromagnetic valve and a motor-operated valve. In one embodiment, the switching valve 300 includes an opening/closing door 312 supported by a rotating shaft 310 and an actuator 314 such as a motor that rotates the rotating shaft 310. The actuator 314 is configured to be controllable by the control unit 900.

In the vehicle interior purification system 1000, the heater element 100 is preferably arranged at a position close to the vehicle interior, in terms of stably ensuring the above functions. Therefore, from the viewpoint of preventing electric shock, the drive voltage is preferably 60 V or less. Since the honeycomb structure 10 used in the heater element 100 has lower electrical resistance at room temperature, the honeycomb structure 10 can be heated at the lower drive voltage. The lower limit of the drive voltage is not particularly limited, but it may preferably be 10 V or more. If the drive voltage is less than 10 V, the current during heating of the honeycomb structure 10 is increased, so that the electric wire 810 should be thickened.

In the embodiment shown in FIG. 5, the ventilation 600 is installed on an upstream side of the heater element 100. More particularly, the ventilator 600 is installed in the middle of the inflow pipe 400 that communicates the heater element 100 with the vehicle interior, and the air that has passed through the ventilator 600 flows in so as to be pressed into the heater element 100. Alternatively, the ventilator 600 may be installed on a downstream side of the heater element 100. In this case, the ventilator 600 may be installed, for example, in the middle of the outflow pipe 500, and the air that has passed through the inflow pipe 400 flows in so as to be sucked into the heater element 100.

Examples

As ceramic raw materials, $BaCO_3$ powder, $TiO_2$ powder and $La(NO_3)_3 \cdot 6H_2O$ powder were prepared. These powders were weighed so as to have the predetermined composition after firing, and dry-mixed to obtain a mixed powder. The dry mixing was carried out for 30 minutes. Subsequently, 3 to 30 parts by weight of water, a binder, a plasticizer and a dispersant in total were added by a proper amount, based on 100 parts by mass of the obtained mixed powder, such that aceramic formed body having a relative density of 64.8% were obtained after extrusion, and then kneaded to obtain a green body. Methyl cellulose was used as the binder. Polyoxyalkylene alkyl ether was used as the plasticizer and the dispersant.

The obtained green body was then introduced into an extrusion molding machine and extruded using a predetermined die to obtain a honeycomb structure having the shape as shown below after the firing.

Shape of the cross section and each end face of the honeycomb structure orthogonal to the flow path direction: quadrangular;

- Shape of the cross section of each cell orthogonal to the flow path direction: quadrangular;
- Thickness of the partition wall: 0.127 mm;
- Thickness of the outer peripheral wall: 0.127 mm;
- Cell density: 85.3 cells/$cm^2$;
- Cell pitch: 1.08 mm;
- Opening ratio of the cells: 0.78;
- Cross-sectional area of the honeycomb structure orthogonal to the extending direction of the flow path direction: 4721 $mm^2$ (47.21 $cm^2$);
- Length L3 of the honeycomb structure in the extending direction of the flow path: 11 mm;
- Volume resistivity at 25° C. of the material forming the outer peripheral wall and the partition walls: 15 Ω·cm; and
- Curie point of the material forming the outer peripheral wall and the partition walls: 120° C.

Subsequently, after dielectric drying and hot air drying of the obtained honeycomb formed body, it was degreased in an air atmosphere in a firing furnace (at 450° C. for 4 hours), and then fired in an air atmosphere to obtain a honeycomb structure. The firing was carried out by maintaining it at 950° C. for 1 hour, and then increasing the temperature to 1200° C. and maintaining it at 1200° C. for 1 hour, and then increasing the temperature at a temperature increasing rate of 200° C./hour to 1400° C. (the maximum temperature) and maintaining it at 1400° C. for 2 hours.

The first electrode and the second electrode each having the configuration as shown in FIGS. 1A and 1B were then formed on both end faces (first end face and second end face) and at least some of the partition walls of the obtained honeycomb structure. The first electrode was formed as follows. First, an electrode slurry containing aluminum (electrode material), ethyl cellulose, and diethylene glycol monobutyl ether (organic binder) was prepared, and the honeycomb structure was immersed in the electrode slurry from the first end face to a desired depth in the flow path direction of the honeycomb structure. Subsequently, after removing an excess electrode slurry on the outer periphery of the honeycomb structure by blowing and wiping, the electrode slurry was dried to form the electrode portions A1 and B1 on the first end face and the surfaces of the partition walls. Similarly, for the second electrode, using the same electrode slurry, the honeycomb structure was immersed in the electrode slurry from the second end face to a desired depth in the flow path direction of the honeycomb structure, and an excess electrode slurry on the outer periphery of the honeycomb structure was removed and dried to form electrode portions A2 and B2 on the second end face and the surfaces of the partition walls.

The following evaluations were performed on each sample of the heater elements obtained as described above.

<Flow Path Direction Length $D_{B1}$ of Electrode Portion B1, Flow Path Direction Length $D_{B2}$ of Electrode Portion B2, Distance L1 Between Electrode Portion B1 and Electrode Portion B2, and Distances L2 Between Electrode Portions B1 and Between Electrode Portions B2 Facing Each Other Across Cell>

According to the above methods, $D_{B1}$, $D_{B2}$, L1 and L2 were determined, respectively.

Further, using the obtained L1, a ratio of L1 to L3 (the length of the honeycomb structure in the extending direction of the flow path as described above) (L1/L3×100 [%]) was calculated.

Furthermore, using the obtained L2, a ratio of L2 to a hydraulic diameter (Dc) of the cell (L2/Dc×100 [%]) was calculated.

It should be noted that the hydraulic diameter of the cell was determined according to the method as described above.

Electrical resistance reduction rate (%)=(electrical resistance of sample No. 1−electrical resistance of each of other samples)/electrical resistance of sample No. 1×100

In this evaluation, a sample having an electrical resistance reduction rate of 20% or less is represented as A, a sample having an electrical resistance reduction rate of more than 20% and less than 90% is represented as B, and a sample having an electrical resistance reduction rate of 90% or more is represented as C.

<Clogging of Cells>

Differential pressure gauges were installed upstream and downstream of each sample, air was circulated at a flow rate of 45 $m^3/h$, and a pressure loss was measured. After conducting a dust test based on JIS D 0207: 1977, the pressure loss of each sample was measured again, and the evaluation of clogging of the cells was carried out by calculating a pressure loss increasing rate (pressure loss after electrical conduction test/pressure loss before electrical conduction test (initial)×100). In this evaluation, a sample having a pressure loss increasing rate of 5% or less is represented as A, a sample having a pressure loss increasing rate of more than 5% and less than 10% is represented as B, and a sample having a pressure loss increasing rate of 10% or more is represented as C.

<Corrosion of Electrodes>

The electrical resistance was calculated when 12.5V was applied to each sample. A water spraying test was conducted by spraying water at 100 cc/min for 1.5 hours while applying a voltage of 12.5 V to each sample. After this water spraying test, the electrical resistance when 12.5 V was applied was calculated. Then, the corrosion of the electrode was evaluated by calculating an electrical resistance increasing rate (electrical resistance after water spraying test/electrical resistance before water spraying test×100). In this evaluation, a sample having an electrical resistance increasing rate of 5% or less is represented as A, a sample having an electrical resistance increasing rate of more than 5% and less than 10% is represented as B, and a sample having electrical resistance increasing rate of 10% or more is represented as C.

Table 1 shows the above evaluation results.

TABLE 1

| Sample Nos. | $D_{B1}$ [mm] | $D_{B2}$ [mm] | L1/L3 × 100 [%] | L2/Dc × 100 [%] | Short Circuit | Clogging of Cells | Corrosion of Electrodes | Sections |
|---|---|---|---|---|---|---|---|---|
| 1 | 0.11 | 0.11 | 98 | 98 | A | A | C | Comp. |
| 2 | 0.17 | 0.17 | 97 | 97 | A | A | B | Ex. |
| 3 | 0.28 | 0.28 | 95 | 95 | A | A | A | Ex. |
| 4 | 0.55 | 0.55 | 90 | 90 | A | A | A | Ex. |
| 5 | 0.83 | 0.83 | 85 | 85 | A | A | A | Ex. |
| 6 | 1.65 | 1.65 | 70 | 70 | A | A | A | Ex. |
| 7 | 2.20 | 2.20 | 60 | 60 | A | A | A | Ex. |
| 8 | 2.75 | 2.75 | 50 | 50 | A | A | A | Ex. |
| 9 | 3.30 | 3.30 | 40 | 40 | B | B | A | Ex. |
| 10 | 3.85 | 3.85 | 30 | 30 | B | B | A | Ex. |
| 11 | 4.40 | 4.40 | 20 | 20 | C | C | A | Comp. |

<Short Circuit>

The current value was measured when 12.5 V was applied to each sample, and the electrical resistance was calculated. Then, using the electrical resistance of sample No. 1 as a reference, the evaluation of short circuit was performed by calculating an electrical resistance reduction rate of each of the other samples. The method for calculating the electrical resistance reduction rate is as follows:

As shown in Table 1, the samples in which the distance L1 between the electrode portion B1 and the electrode portion B2 was 30 to 97% of the length L3 in the extending direction of the flow path of the honeycomb structure had good evaluations for the short circuit and the corrosion of the electrodes (evaluation result of A or B). Also, samples in which the distances L2 between the electrode portions B1 and between the electrode portions B2 facing each other across the cell were 30 to 97% of the hydraulic diameter Dc of the cell also had a good evaluation for the clogging of the cells (evaluation result of A or B).

As can be seen from the above results, according to the present invention, it is possible to provide a heater element which is resistant to corrosion of electrodes even in an environment where moisture is present while widening a region in an extending direction of a flow path where a functional material can effectively be heated, and which can suppress the occurrence of short circuit. Also, according to the present invention, it is possible to provide a vehicle interior purification system including such a heater element.

DESCRIPTION OF REFERENCE NUMERALS

10 honeycomb structure
11 outer peripheral wall
12*a* first end face
12*b* second end face
13 cell
13*a* side portion
13*b* corner portion
14 partition wall
20 first electrode
30 second electrode
40 functional material-containing layer
50 moisture
100 heater element
200 power supply
300 switching valve
310 rotation shaft
312 opening/closing door
314 actuator
400 inflow pipe
500 outflow pipe
500*a* first path
500*b* second path
600 ventilator
810, 820, 830 electric wire
900 control unit
910 power switch
1000 vehicle interior purification system

The invention claimed is:

1. A heater element, comprising:

a honeycomb structure comprising an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property;

a first electrode comprising an electrode portion A1 provided on the first end face, and an electrode portion B1 connected to the electrode portion A1 and provided on surfaces of the partition walls in an extending direction of the flow path from the first end face; and a second electrode comprising an electrode portion A2 provided on the second end face, and an electrode portion B2 connected to the electrode portion A2 and provided on surfaces of the partition walls in the extending direction of the flow path from the second end face, wherein a distance L1 between the electrode portion B1 and the electrode portion B2 is 30 to 97% of a length L3 of the honeycomb structure in the extending direction of the flow path.

2. The heater element according to claim 1, wherein the distance L1 is 50 to 95% of the length L3 of the honeycomb structure in the extending direction of the flow path.

3. The heater element according to claim 1, wherein a distance L2 between the electrode portions B1 and between the electrode portions B2 facing each other across the cell is 30 to 97% of a hydraulic diameter of the cell.

4. The heater element according to claim 3, wherein the distance L2 is 50 to 95% of the hydraulic diameter of the cell.

5. The heater element according to claim 1, wherein the material having the PTC property is made of a material comprising barium titanate as a main component, the material being substantially free of lead.

6. The heater element according to claim 1, wherein the material having the PTC property has a volume resistivity of 0.5 to 30 Ω·cm at 25° C.

7. The heater element according to claim 1, wherein the honeycomb structure has a thickness of the partition wall of 0.3 mm or less, a cell density of 100 cells/$cm^2$ or less, and a cell pitch of 1.0 mm or more.

8. The heater element according to claim 1, wherein the honeycomb structure has a thickness of the partition wall of 0.08 to 0.36 mm, a cell density of 2.54 to 140 cells/$cm^2$, and an opening ratio of the cells of 0.70 or more.

9. The heater element according to claim 1, comprising a functional material-containing layer on surfaces of the partition walls on which the electrode portions B1 and B2 are not provided.

10. The heater element according to claim 9, further comprising the functional material-containing layer on surfaces of the electrode portions B1 and B2.

11. The heater element according to claim 9, wherein the functional material-containing layer comprises a functional material having a function of adsorbing one or more selected from water vapor, carbon dioxide, and volatile components.

12. The heater element according to claim 9, wherein the functional material-containing layer comprises a catalyst.

13. A vehicle interior purification system, comprising:

at least one heater element according to claim 1;

a power supply for applying a voltage to the heater element;

an inflow pipe communicating a vehicle interior with the first end face of the heater element;

an outflow pipe having a first path communicating the second end face of the heater element with the vehicle interior; and a ventilator for causing an air from the vehicle interior to flow into the first end face of the heater element through the inflow pipe.

14. The vehicle interior purification system according to claim 13, wherein the outflow pipe has, in addition to the first path, a second path communicating the second end face of the heater element with the outside of a vehicle, wherein the outflow pipe has a switching valve capable of switching the flow of the air flowing through the outflow pipe between the first path and the second path, and wherein the vehicle interior purification system comprises a control unit capable of executing switching between:

a first mode wherein the voltage applied from the power supply is turned off, the switching valve is switched such that the air flowing through the outflow pipe passes through the first path, and the ventilator is turned on; and a second mode wherein the voltage applied from the power supply is turned on, the switching valve is switched such that the air flowing through the outflow pipe passes through the second path, and the ventilator is turned on.

* * * * *